US008701097B2

(12) United States Patent
Doyle et al.

(10) Patent No.: US 8,701,097 B2
(45) Date of Patent: Apr. 15, 2014

(54) PARTIAL INLINING WITH SOFTWARE BASED RESTART

(75) Inventors: Patrick R. Doyle, Toronto (CA); James I. A. Gartley, Markham (CA); Derek B. Inglis, Markham (CA); Vijay Sundaresan, North York (CA)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 13/022,914

(22) Filed: Feb. 8, 2011

(65) Prior Publication Data

US 2012/0117549 A1 May 10, 2012

(30) Foreign Application Priority Data

Nov. 5, 2010 (CA) ..................................... 2719653

(51) Int. Cl.
*G06F 9/45* (2006.01)
(52) U.S. Cl.
USPC ........... 717/151; 717/106; 717/148; 717/140; 717/158; 717/159
(58) Field of Classification Search
None
See application file for complete search history.

(56) References Cited

U.S. PATENT DOCUMENTS

| 5,701,489 | A | 12/1997 | Bates et al. | |
|---|---|---|---|---|
| 6,072,951 | A | 6/2000 | Donovan et al. | |
| 6,195,793 | B1 | 2/2001 | Schmidt | |
| 6,363,521 | B1 | 3/2002 | Yasue et al. | |
| 6,507,946 | B2 * | 1/2003 | Alexander et al. | 717/145 |
| 6,986,130 | B1 | 1/2006 | Boucher | |
| 7,293,260 | B1 * | 11/2007 | Dmitriev | 717/130 |
| 7,526,760 | B1 * | 4/2009 | Daynes et al. | 717/153 |
| 7,779,394 | B2 * | 8/2010 | Homing et al. | 717/136 |
| 8,225,271 | B2 * | 7/2012 | Eldridge et al. | 717/101 |
| 8,285,958 | B1 * | 10/2012 | Sallam | 711/165 |
| 2002/0104077 | A1 * | 8/2002 | Charnell et al. | 717/162 |
| 2002/0112227 | A1 * | 8/2002 | Kramskoy et al. | 717/148 |
| 2006/0190953 | A1 | 8/2006 | Nakashima et al. | |
| 2007/0234307 | A1 | 10/2007 | Luk et al. | |
| 2008/0059875 | A1 * | 3/2008 | Ishizaki et al. | 715/256 |
| 2009/0172636 | A1 * | 7/2009 | Griffith et al. | 717/113 |
| 2009/0193404 | A1 * | 7/2009 | Kielstra et al. | 717/148 |

FOREIGN PATENT DOCUMENTS

WO 0210909 A2 2/2002

OTHER PUBLICATIONS

Suganuma et al., "A Region-Based Compilation Technique for a Java Just-In-Time Compiler", PLDI'03, Jun. 9-11, 2003, San Diego, California, USA, 12 pages.
Kalev, "Whole Program Optimization Part II", informIT, Jul. 8, 2005, p. 225 of 458.

(Continued)

*Primary Examiner* — Chameli Das
(74) *Attorney, Agent, or Firm* — Yee & Associates, P.C.; David A. Mims, Jr.

(57) ABSTRACT

A compiler and method of optimizing code by partial inlining of a subset of blocks of called blocks of code into calling blocks of code. A restart of the called blocks of code is provided for the case where non-inlined blocks of code are reached at run time. Blocks selected for partial inlining may include global side effects depending on the computer program environment. Global side effects in the selected blocks of code leading to a restart are sanitized in order to defer changes to the global state of the computer program.

22 Claims, 6 Drawing Sheets

(56) References Cited

OTHER PUBLICATIONS

Merrill et al., "Trace Fragment Selection within Method-based JVMs", VEE '08. Mar. 5-7, 2008, Seattle, Washington, USA, 10 pages.

Da Silva et al., "Design, Implementation, and Evaluation of a Dynamic Compilation Framework for the YAP System", Lecture Notes in Computer Science, Aug. 27, 2007, pp. 410-424, Springer Berlin / Heidelberg, 1 page.

* cited by examiner

PARTIAL INLINING WITH SOFTWARE BASED RESTART

BACKGROUND

1. Field

The present disclosure relates to compilation and optimization of software code and more specifically, to a method of partial inlining code.

2. Description of the Related Art

In the JAVA programming language environment, JAVA source code is compiled by a JAVA compiler into an intermediate and architecture neutral format referred to as bytecode. Bytecode is neither human readable nor able to be executed by a data processing system. JAVA applications typically are compiled using a JAVA compiler and may be distributed in the intermediate bytecode format. In order to execute a JAVA application on a user's computer or data processing system, the JAVA bytecode is interpreted by a Java Virtual Machine (JVM). The JVM resides in the data processing system and creates machine code instructions for the specific architecture of the data processing system. Thus, rather than compiling JAVA source code into numerous architecture specific object code or machine code formats, the neutral intermediate bytecode is available and can be interpreted and executed using the JVM. While this provides portability for JAVA software applications, code is interpreted and executed dynamically such as on a line by line basis and typically executes more slowly than applications in other programming languages which execute from object code compiled directly from source code.

A JVM may include a just-in-time (JIT) compiler which re-compiles some or all of the JAVA bytecode at execution time into platform specific machine code in order to improve performance and execution speed. The JIT compiler may analyze and compile blocks of code in order to create an optimized version of machine code for the architecture of the data processing system. To further improve performance, the JIT compiler may perform an optimization technique known as inlining. Inlining is the process of replacing a method call in the code being compiled with the code of the entire method itself. As a result of inlining, the overhead of performing the method call is eliminated and more code is exposed to optimization by the JIT compiler. However, methods often include rarely executed or cold code such as debugging code that increases the size of the method and inlined code. A fully inlined method may increase compile time and cold code in the method can interfere with optimizing the hot path by introducing unnecessary merges and branches in the control flow graph (CFG).

Partial inlining is a compiler optimization method in which only part of a called method is inlined instead of inlining the method code in its entirety. Since non-inlined code is removed, in order to perform partial inlining, provision must be made to handle the case where program control falls into code that was not inlined.

SUMMARY

According to one embodiment of the present disclosure, there is provided a method of partial inlining called blocks of code into calling blocks of code of a computer program comprising: selecting a subset of blocks of the called blocks of code for inlining into the calling blocks of code; creating a restart block to restart the called blocks of code in place of non-selected blocks of the called blocks of code; sanitizing global side effects in the selected blocks in order to preserve a correct global state of the computer program if a restart of the called blocks of code occurs; and inlining the restart block and the selected blocks into the calling blocks of code of the computer program.

According to another embodiment of the present disclosure there is provided a data processing system for optimizing a computer program which includes calling blocks of code and called blocks of code, the data processing system comprising: an optimizer configured to: select a subset of blocks of the called blocks of code for inlining into the calling blocks of code; create a restart block to restart the called blocks of code in place of non-selected blocks of the called blocks of code; sanitize global side effects in the selected blocks in order to preserve a correct global state of the computer program if a restart of the called blocks of code occurs; and inline the restart block and the selected blocks into the calling blocks of code of the computer program.

DETAILED DESCRIPTION

Figure 1:
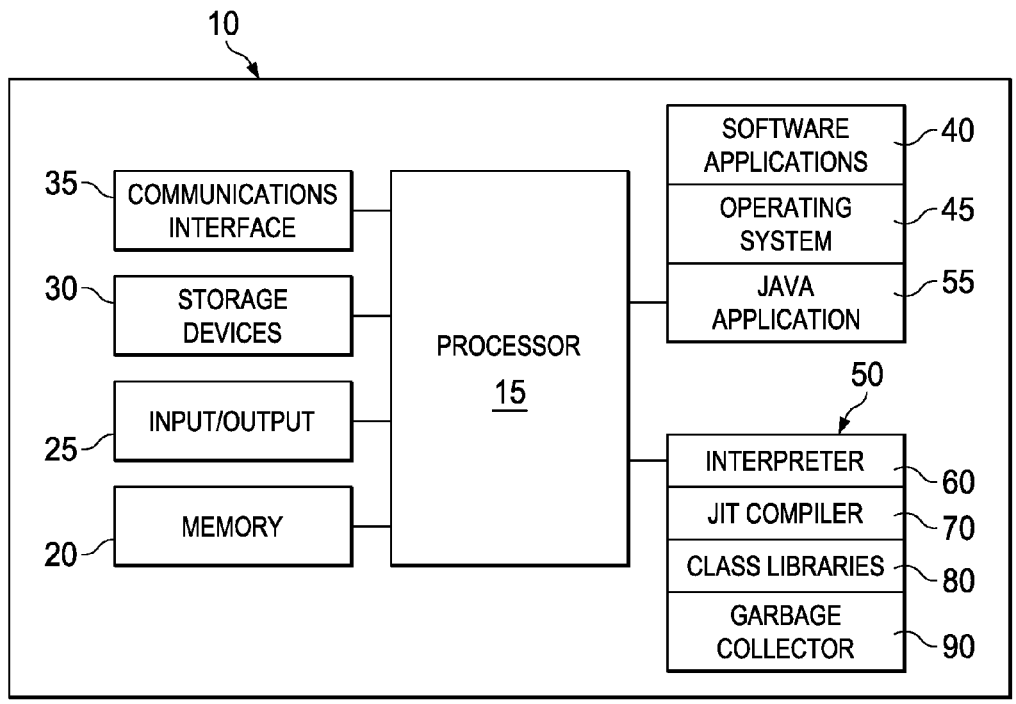
FIG. 1 is a block diagram illustrating a data processing system in accordance with an embodiment of the present disclosure.

As will be appreciated by one skilled in the art, aspects of the present disclosure may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor 15 of a general purpose computer, special purpose computer, or other programmable data processing apparatus 10 to produce a machine, such that the instructions, which execute via the processor 15 of the computer or other programmable data processing apparatus 10, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The Data Processing System

FIG. 1 illustrates a block diagram of a data processing system or computer 10 in which embodiments of the present disclosure may be implemented. The data processing system 10 includes a processor 15 connected to a memory 20 which may include but is not limited to random access memory (RAM), read only memory (ROM), flash memory or any other computer readable medium for storing information and instructions to be executed by the processor 15. The processor 15 also may include one or more cache memories or caches for storing instructions. The data processing system 10 may include and support a number of input/output devices 25 such as a keyboard and a display monitor (not shown). The data processing system 10 also may include or support additional storage devices 30 such as a hard disk drive, a floppy disk drive, a magnetic tape drive, an optical disk drive, a CD-ROM unit or other devices for reading, writing or reading and writing computer readable storage media. The data processing system 10 may include a communications interface 35 such as a network interface, Ethernet card, cellular communications system or other communications port to enable software and data to be received and transmitted by the data processing system 10.

The processor 15 may operate under the control of a number of software applications 40, such as an operating system 45, which are loaded in to the memory 20 for execution by the processor 15. The operating system 45 provides platform specific support for software applications 40 executing on the data processing system 10. A JAVA virtual machine (JVM) 50 provides a JAVA run-time environment to execute JAVA applications 55. The JVM resides in the memory 20 and executes in conjunction with the operating system 45. Software applications 40 and JAVA applications 55 also may reside in or be downloaded from storage devices 30 or be received by the data processing system 10 via the communications interface 35. JAVA applications 55 typically comprise bytecode representations of JAVA programs which have been compiled from source code by a JAVA compiler (not shown).

In one embodiment, the JVM 50 includes an interpreter 60 and a just-in-time (JIT) compiler 70. The JVM 50 also may include other components including but not limited to class libraries 80 and a garbage collector 90. The interpreter 60 decodes or translates bytecode of a JAVA application 55 for execution by the data processing system 10. The interpreter 60 operates dynamically and decodes bytecode on a line by line, block by block or bytecode by bytecode basis during execution. Alternatively, or in addition to the operation of the interpreter 60, the JIT compiler 70 may be used to recompile some of the bytecode of a JAVA application 55 into machine-readable code or machine code for the specific architecture or platform of the data processing system 10. The JIT compiler 70 operations typically are performed at run time and include a number of operations to analyze, process and optimize the bytecode in order to improve the performance of the architecture specific machine code. In one embodiment, the JVM 50 does not include an interpreter 60 and all bytecode is compiled by the JIT compiler 70. The machine code created by the JIT compiler 70 may be stored in memory 20 or in the cache of the processor 15 for re-use the next time the particular method is used.

The JIT compiler 70 typically comprises a number of components such a front end, an optimizer and a code generator (not shown). The front end converts JAVA bytecode into an intermediate language representation (IL) or "IL code" which provides a further architecture neutral representation of the computer program which may be analyzed by the optimizer of the JIT compiler 70. It will be appreciated that the IL code comprises an intermediate representation of the code of interest which is being compiled and is not necessarily stored or maintained by the data processing system 10 or in memory 20 after compiling is complete. The partial inlining techniques of the present disclosure may be applied to a computer program, a bytecode representation of the program, a further intermediate representation or other representations of the computer program generated, used or generated and used by the compiler or data processing system 10 which performs the partial inlining. The front end also creates a control flow graph (CFG) which captures information of the control flow behavior of the IL code. The CFG may be modified, stored and reused by the JIT compiler 70 through one or more optimizations of the IL code. The optimizer analyzes the IL code and CFG and may apply a number of optimization techniques such as partial inlining according to the present disclosure as well as other optimization techniques. Finally, the code generator maps the optimized IL code into machine code for the architecture of the data processing system 10 and creates a compiled version of the code which may be executed by the data processing system 10.

It will be appreciated that the components of FIG. 1 will vary depending on the implementation of the data processing system 10. Aspects of the present disclosure are described with respect to JAVA applications 55, bytecode, intermediate language representations (IL), the JVM 50 and JIT compiler 70 although it will be appreciated that the method of partial inlining described herein may be applied to code and operations by the JAVA compiler (not shown) to the extent permitted by JAVA specifications. The method of partial inlining described herein also may be applied to compilers and just-in-time compilers for other programming languages including but not limited to C, C++, PLX, C#, D, Fortran, or Cobol and intermediate language representations along with complementary ways to address global side effects as discussed below.

Partial Inlining and Execution of Code

Figure 2A:
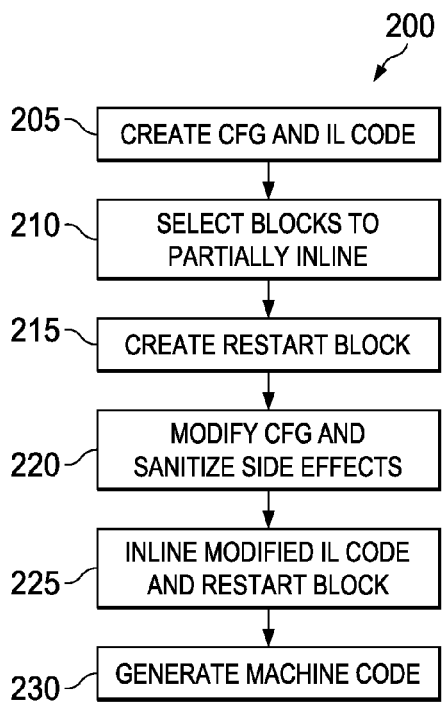
FIG. 2A is a flowchart of a method of compiling in accordance with an embodiment of the present disclosure.
Figure 2B:
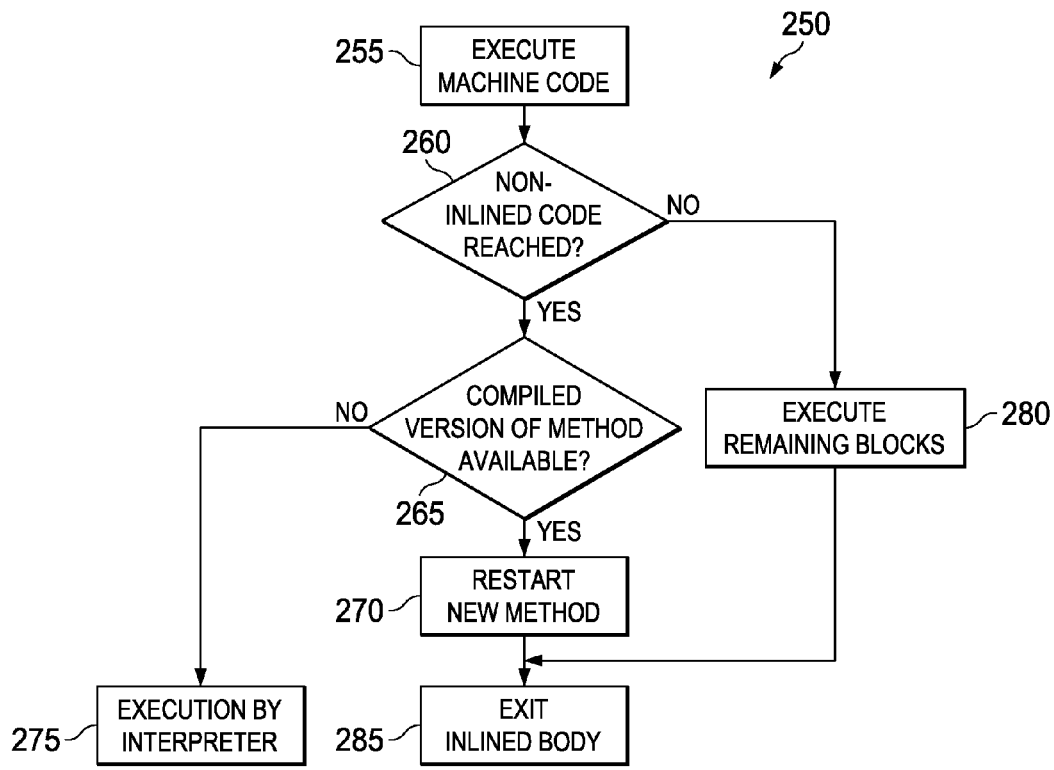
FIG. 2B is a flowchart of a method of executing partially inlined code in accordance with an embodiment of the present disclosure.
Figure 3A:
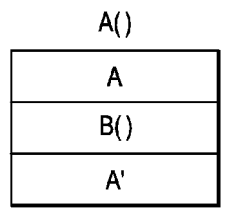
FIGS. 3A, 3B, 3C and 3D illustrate sample methods, control flow graphs and partially inlined blocks of code in accordance with an embodiment of the present disclosure.
Figure 3B:
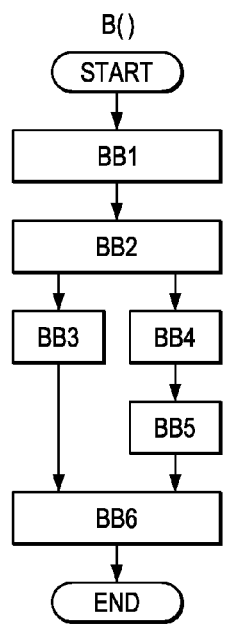
Figure 3C:
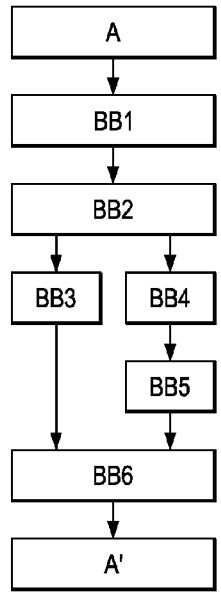
Figure 3D:
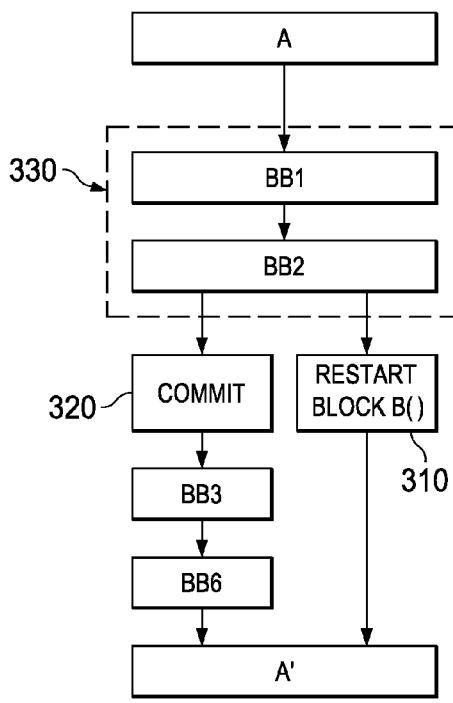

FIGS. 2A and 2B illustrate high level flow charts for a method 200 of compiling code and a method 250 of executing code including partial inlining of code according to the present disclosure. The compilation and partial inlining are performed on any section of code of interest which may correspond to a unit of source code such as a method in JAVA source code. The following description refers to a JAVA method and calling and called methods for purposes of discussion but it will be understood that the present disclosure is not limited to discrete or complete portions of bytecode or IL code corresponding to complete programs, methods or functions. For purposes of illustration and discussion, sample blocks of code, control flow graphs and the resulting partially inlined code are illustrated in FIGS. 3A, 3B, 3C and 3D. FIG. 3A illustrates a method A( ), the calling method or original calling blocks of code, which includes a call to method B( ), the called method or called blocks of code. FIG. 3B illustrates a representation of a CFG for method B( ) showing the blocks of code and potential execution paths that may be taken through the blocks of code for B( ). FIG. 3B illustrates two possible paths from the start of B( ) to the end of B( ), through BB1, BB2, BB3 and BB6 or through BB1, BB2, BB4, BB5 and BB6. FIG. 3C illustrates the CFG for method B( ) inlined into method A( ) according to conventional inlining methods. In order to avoid inlining all blocks of method B( ) into A( ), only a subset of the blocks of B( ) may be selected and inlined into A( ) as described below. FIG. 3D illustrates the result of the partial inlining of method B( ) into method A( ) according to an embodiment of the present disclosure.

Referring back to FIG. 2A, at 205, in one embodiment the JIT compiler 70 creates one or more CFGs for the section of code of interest, such as a method or calling method A( ), and a called method, such as called method B( ). The JIT compiler 70 also creates the IL code for the code of interest. At 210, a subset of blocks of the called method is selected for partial inlining into the calling method as described below. For example, blocks BB1, BB2, BB3 and BB6 of method B( ) may be selected for inlining into the method A( ). In some cases, a path that is more likely to be executed or the hot path is selected for partial inlining. A path that is less likely to be executed may be referred to as a cold path. The possible control flow transfers between blocks are referred to as edges. Block BB2 in FIG. 3B contains two edges, one edge directed to BB3 and one edge directed to BB4.

At 215, a restart block is created to account for the case where program control falls into code that was not selected for partial inlining. The restart block includes instructions for a software based restart of the entire called method B( ). In the case illustrated in FIG. 3D, blocks BB4 and BB5 are removed from the CFG and replaced by a restart block 310 which calls a previously compiled version of the method B( ) which includes blocks BB4 and BB5. One or more previously compiled versions of B( ) may be stored in memory 20.

At 220, the CFG is modified at to account for the case where program control falls into code that was not selected for partial inlining. The CFG is modified to ensure the edge leading to the restart point (formerly to BB4) is redirected to the restart block 310. Alternatively, during execution, the restart of method B( ) may be directed to the interpreter 60, if present, in order to restart B( ) and interpret and execute the called method B( ) line by line.

Also at 220, measures to sanitize global side effects are implemented which may include modifications to the IL code in the blocks selected for inlining, as described below. A global side effect comprises an instruction or set of instructions which affect or modify the state of the computer program in which A( ) and B( ) are executed. State comprises of local and global state. The global state of the computer program comprises anything that is visible outside of the thread or the methods being compiled. Thus, global side effects comprise an instruction or set of instructions which affect or modify anything visible outside of the thread or methods being compiled. Local side effects comprise modifications to the local state and are acceptable within the speculative region since the code affected by local side effects is within the scope of the current compilation.

According to an embodiment of the present disclosure, global side effects, if present, may be handled by "sanitizing", which includes deferring or undoing, or a combination of deferring and undoing, the results of the global side effects. Sanitizing ensures global side effects properly modify the global state in order to preserve a correct global state of the computer program if a restart of the called method B( ) occurs. Since it is unknown during the execution of BB1 and BB2 whether program control will continue to the next inlined block, such as BB3, or whether program control will continue to a restart point, resulting in the restart of the method and execution of BB1 and BB2 a second time, global side effects are sanitized and the results of global side effects on the global state are implemented only after the program control is determined to continue past the restart point to the next inlined block.

Sanitizing may be achieved by relying on architecture and operations inherent in the computer program environment, by adding instructions to undo global side effects, by providing temporary measures and modifying instructions to capture and hold the results of global side effects until program control reaches a place where a restart point is no longer reachable, or by a combination of these procedures. In the example of FIG. 3D, blocks BB1 and BB2 may include modifications to sanitize global side effects in those blocks. When the program control flows from BB2 to BB3, past the potential restart point, the global side effects are put into effect in the global state or committed by inserting a commit block 320 with instructions to update the global state based on the temporary measures provided in BB1 and BB2.

Any block which may reach a restart point of a partially inlined method is referred to herein as a "speculative block" since it is unknown, until the restart point is passed, whether the results of instructions executed in the speculative blocks should be made visible to the rest of the program. In other words, the instructions in these blocks are executed on a speculative basis. If a restart point is reached, the instructions in BB1 and BB2 should not appear to have been executed. With reference to FIG. 3D, blocks BB1 and BB2 each are referred to as a speculative block. A speculative region 330 comprises a series of interconnected speculative blocks for a called method, such as the speculative region 330 consisting of BB1 and BB2.

Once it is known that the program control will continue past a restart point from inlined blocks of code in the speculative region 330 to inlined blocks of code outside the speculative region 330, such as block BB3 in FIG. 3D, changes to the global state may be implemented or committed at a commit point at the exit of the path through the speculative region 330. The exit from the speculative region 330 and commit point also may occur at the transition from an inlined block of code of the called method to a block of code of the calling method (not shown).

The speculative blocks and speculative region arise as a result of the subset of blocks of the called method selected to be inlined in the calling method. Inherently, program control may not exit and re-enter the speculative region since, by definition, any block that can reach a speculative region also can reach a restart point and thus is itself a speculative block and part of the speculative region. For example, a loop must be either completely within the speculative region or completely outside of the speculative region. As well, "nested" speculative regions are not permitted. If there was a series of nested speculative regions, any commit of the global side effects in a nested speculative region would change the global state of the program, effectively requiring a commit of the side effects of any outer region. Conversely, committing measures to address side effects in an outer speculative region requires any inner speculative regions to be complete. If an inner speculative region is not complete, a restart can occur, which would have the unwanted result of re-executing instructions in the speculative blocks for which the results of global side effects already have been updated to the global state.

As noted above, global side effects present in the speculative region are sanitized by relying on architecture and operations inherent in the computer program environment, by adding instructions to undo global side effects, by providing temporary measures and modifying instructions to capture and hold the results of global side effects until a commit block is reached, or by a combination of these procedures. Temporary measures will be understood to include measures added to the speculative blocks which are automatically discarded by the computer program environment when the block is exited or which must be explicitly discarded. In the example of FIG. 3D, the IL code of blocks BB1 and BB2 may be modified to incorporate temporary measures or added instructions to sanitize global side effects. When the program control flows from BB2 to BB3, past the potential restart point, the global side effects are put into effect or committed in the commit block 320. The commit block 320 includes instructions to update the global state based on the temporary measures provided in BB1 and BB2 and to discard the temporary measures as needed. If no global side effects are present in the speculative region, or if measures to sanitize global side effects rely on the computer program environment and do not require additional modifications or action, a commit block 320 may not be needed.

As described above, a global side effect comprises an instruction or set of instructions which affect or modify the global state of the computer program in which the calling method A( ) and called method B( ) are executed. If a global side effect exists in a speculative block, its results are sanitized as described herein. The JIT compiler 70 identifies global side effects and classifies each one as an acceptable or unacceptable global side effect. In one embodiment, global side effects are identified and classified by the JIT compiler 70 in the blocks of code of the called method B( ) prior to the creation of the IL code at 205. Acceptable global side effects include global side effects whose results can be sanitized. In the JAVA environment, acceptable global side effects may include but are not limited to stores to global variables, stores to escaping object fields, memory allocations, method calls or caught exceptions.

Unacceptable global side effects include global side effects whose results may not be sanitized or whose results, due to the nature of the instruction, are undesirable to sanitize. For example, in the JAVA environment, unacceptable global side effects may include but are not limited to volatiles and monitors. In one embodiment of the present disclosure, a global side effect may be of a type that is possible to sanitize but nevertheless determined and classified by the JIT compiler 70 as undesirable to include in the speculative region and thus an unacceptable side effect. For example, if the measures needed to sanitize a global side effect or a particular instance of a global side effect are significant, such as requiring significant resources of the processor 15 or memory 20, the JIT compiler 70 may classify the global side effect as unacceptable even if measures are available to sanitize the global side effect. Thus, global side effects which cannot be sanitized may not occur in the speculative region and will be classified as unacceptable side effects. Global side effects which can be sanitized can be classified by the JIT compiler 70 as acceptable or unacceptable.

At 225, the selected blocks of the called method B( ), including any modified IL code in the selected blocks, the restart blocks and commit blocks, if any, are inlined into the calling method A( ). Further optimization procedures and steps to compile the IL code also may be performed in addition to and either before or after partial inlining according to the present disclosure. For example, after 200, further optimization procedures and steps may be performed based on the modified CFG and modified IL code produced according to the present disclosure. At 230, machine code is generated from the modified and optimized IL code for the calling method A( ) and partially inlined blocks of the called method B( ). At this stage, a compiled version of the new program or code consisting of the calling method A( ) and portions of the called method B( ) which have been partially inlined into A( ) has been created. The compiled version of the program may be stored in memory 20.

The compiled code may be executed by the data processing system 10 or any data processing system with a similar architecture including a data processing system and JVM 50 which may not have implemented the present method for optimizing and partially inlining code.

FIG. 2B illustrates a high level flow chart for a method 250 of executing compiled code including code which has been partially inlined according to the present disclosure. At 255, execution of the machine code starts including execution of the inlined code by the JVM 50 of the data processing system 10. During execution, if the program control is directed to non-inlined code 260, the entire called method B( ) is restarted. If a previously compiled version of the method is available 265, the method is restarted at 270 and the previously compiled version may be executed. Alternatively, if a previously compiled version of the method is not available, such as during the first compilation and execution of the method, at 275 program control may pass to the interpreter 60 of the JVM 50 in order to execute the bytecode of the entire method B( ). Program control also may pass to the interpreter 60 even if a previously compiled version is available. If non-inlined code is not reached during execution at 260, the modified code is executed, including execution of measures to handle side effects and instructions in a commit block 320 at the exit from the speculative region. Any remaining partially inlined blocks of the called method are executed and the end of the called method B( ) is reached at 280. Program control exits the inlined blocks of code at 285 and returns to the called method A( ) at the end of the execution of the called method B( ).

Selecting Blocks

Figure 4:
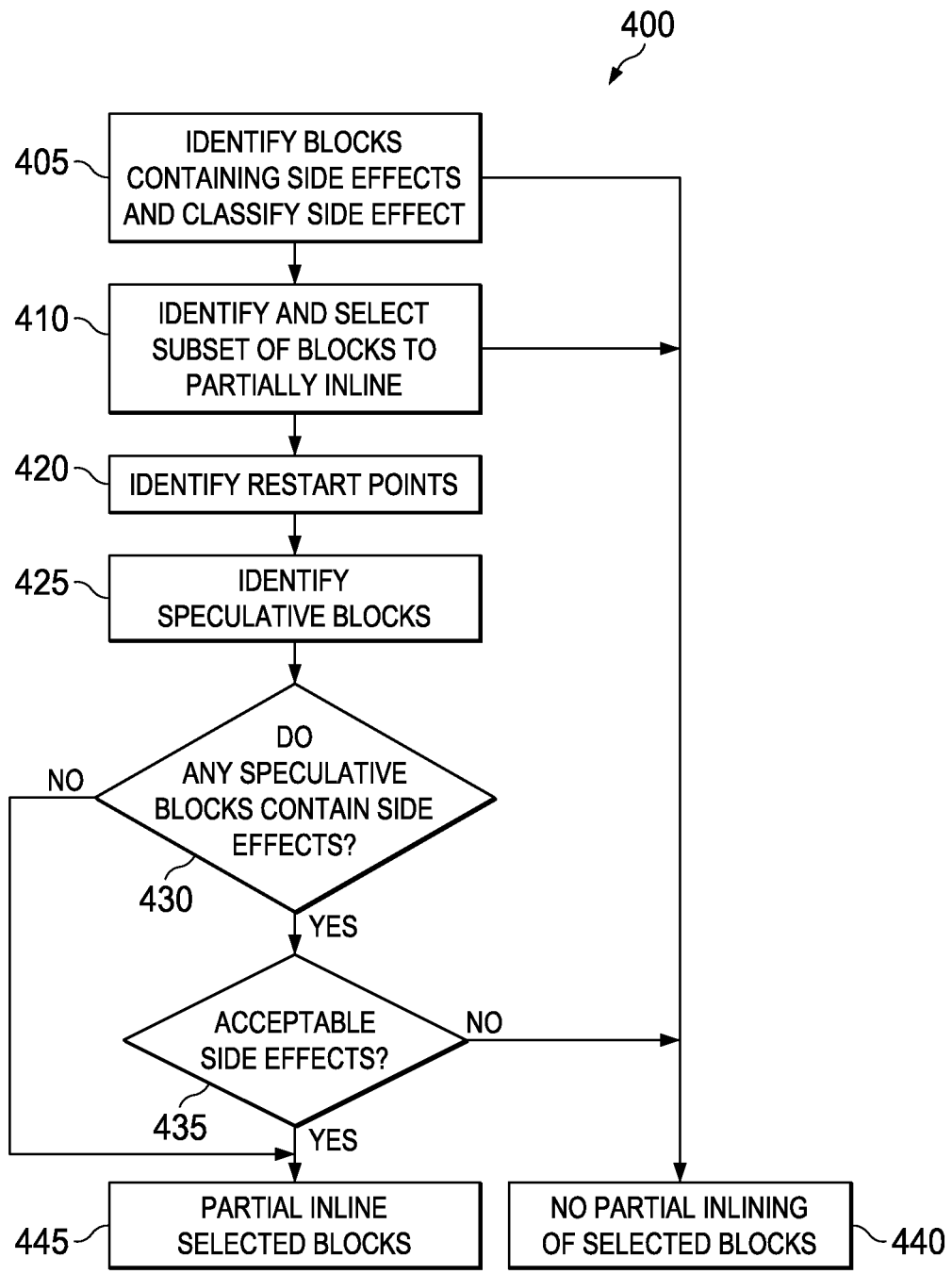
FIG. 4 is a flowchart of a method of selecting blocks to partially inline in accordance with an embodiment of the present disclosure.

FIG. 4 illustrates a method 400 of selecting blocks of code for partial inlining according to an embodiment of the present disclosure. At 405, the JIT compiler 70 reviews the CFG for the code of interest, such as calling method A( ) and called method B( ), to identify blocks of the called method B( ) which contain global side effects. The JIT compiler 70 also determines whether the global side effects may be sanitized and should be classified as acceptable or unacceptable global side effects for the speculative region. At 410, the JIT compiler 70 identifies blocks to partially inline and selects a subset of blocks of the called method B( ) according to known factors such as the frequency of execution of the block and the size of the block as well as factors such as the number of global side effects in a block, the type of global side effects, the locations of restart blocks arising from non-selected blocks and the costs of sanitizing the global side effects also may be considered. A combination of one or more of these factors also may be used to select blocks for partial inlining. Blocks which are selected as forming a preferred path of the called method may be referred to as the hot path. In the example of FIG. 3C, blocks BB1, BB2, BB3 and BB6 of B( ) are selected to partially inline into A( ).

An additional constraint is applied to the selected blocks. All speculative blocks in the subset of selected blocks should contain either no global side effects or only acceptable global side effects. If any selected speculative block contains an unacceptable side effect, the steps to identify and select blocks to inline, and the steps to classify global side effects as acceptable or unacceptable, may be repeated at 405 and 410 until a subset of selected blocks which meets this constraint is identified. In one embodiment, global side effects are identified and classified in the blocks of the called method B( ) prior to the subset of blocks being selected.

At 420, restart points are identified. Restart points arise for edges in the CFG leading to non-selected blocks as a result of the blocks selected at 410. For example, a restart point in FIG. 3C arises at the end of BB2 with the instruction which determines whether program control passes to BB3 or to the restart point where BB4 is removed. At 425, speculative blocks are identified as any block which may lead to a restart point. In the case of FIG. 3C, blocks BB1 and BB2 are identified speculative blocks. At 430, the speculative blocks are reviewed to determine if each block contains any global side effects. If no global side effects are present the selected blocks of the called method may be inlined into the calling method at 445. In one embodiment, an additional constraint is added to ensure that at least one path from the start of the called method to the end of the called method exists in the subset of blocks selected at 410.

At 435, if global side effects are identified in the speculative blocks, the JIT compiler 70 checks whether each side effect is acceptable or unacceptable, as classified at 405. If all global side effects are acceptable, the selected blocks of the called method may be inlined into the calling method at 445. If any one side effect in one of speculative blocks is an unacceptable side effect, the constraints have not been met and inlining of the selected blocks may not be performed, 440. Alternatively, one or both of the steps to classify global side effects and to identify and select blocks to inline may be repeated at 405 and 410 until a subset of blocks which meet the above constraints are identified.

It will be appreciated that the steps to classify global side effects and select blocks of the called method to inline into the calling method may occur in various order and some steps may occur simultaneously or in parallel. For example, the JIT compiler 70 classifying the side effect as acceptable or unacceptable may occur at 405 for all blocks or at 435 when the global side effects of only speculative blocks are examined. Selecting blocks for partial inlining at 410 also may include a consideration of possible restart points and speculative blocks. In one embodiment, the heuristic may identify blocks without global side effects first and may select blocks for partial inlining and restart points accordingly. In another embodiment, the selection of blocks for partially inlining may occur first with global side effects being identified and classified as acceptable or unacceptable afterwards. If unacceptable global side effects are determined to exist in speculative blocks, these blocks would be removed from the subset of selected blocks and the selection of blocks repeated. In one embodiment, restart points and speculative blocks which arise from non-selected blocks are identified after the subset of blocks of the called method are selected for inlining into the called method.

Partial Inlining

Figure 5:
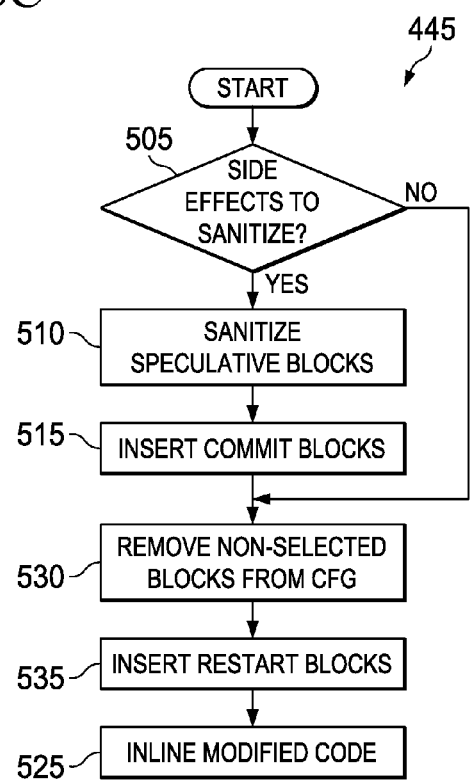
FIG. 5 is a flowchart of a method of partially inlining selected blocks in accordance with an embodiment of the present disclosure.

FIG. 5 illustrates the procedures for partial inlining of the selected blocks 445, including modifications of the selected blocks and the CFG to account for the restart of the called method and global side effects, if any. At 505, if global side effects are present, the speculative blocks containing global side effects are sanitized at 510. Sanitizing the speculative blocks may comprise modifying instructions and inserting instructions for temporary measures into the speculative blocks in order to provide temporary variables, flags, hash tables or other measures needed to temporarily capture the results of global side effects. Instructions to provide temporary measures may be inserted at the start of each speculative block containing one or more global side effects or in a unique entry block of the called method B( ). Instructions within the speculative blocks also may be modified to incorporate the temporary measures. Sanitizing of global side effects may rely on the architecture of the computer program environment and operations therein such that no additional instructions or modification of instructions in the speculative blocks are required to address global side effects. Sanitizing global side effects also may include modification and insertion of instructions in the speculative blocks in order to optimize the computer program in addition to addressing the global side effects. Examples of sanitizing possible global side effects are described below.

At 515, one or more commit blocks 320 may be inserted into the CFG. A commit block 320 comprises a sequence of instructions to commit or store the changes to the program's global state resulting from the execution of the code in the speculative blocks, including the results of global side effects as captured by the temporary measures. A commit block 320 is inserted at the exit of the last block on the path through the speculative region. Since multiple paths through the speculative region and therefore multiple exits may exist, multiple commit blocks 320 may be inserted, one at each exit from the speculative region. A commit block 320 for a particular exit consists of a sequence of instructions to commit to the global state the results of global side effects in the sequence of speculative blocks in the path to that exit. To maintain program correctness, the order of stores is thus preserved in each commit block 320. If no global side effects are present in the speculative region, steps to sanitize side effects and insert commit blocks are not performed. If measures to sanitize global side effects rely on the computer program environment and do not require additional modifications or actions to update the global state, a commit block 320 may not be inserted.

At 530, the non-selected blocks are removed from the CFG. In the example of FIG. 3D, blocks BB4 and BB5 are removed. At 535, a restart block 310 is inserted in place of the removed blocks. The restart block 310 includes instructions to discard any temporary measures which have been put in place for global side effects in the speculative blocks BB1 and BB2 and instructions to cause an exit from the partially inlined blocks of B( ). Discarding temporary measures may include, for example in a C++ program environment, deallocation of memory which had been allocated in a speculative block. The CFG also is modified to redirect restart edges leading to removed blocks to the restart block 310. In the example shown in FIG. 3D, the restart block 310 includes a call to the method B( ). The method restarted by the restart block 310 will depend on whether additional methods are called or partially inlined into the method B( ) as described below. If multiple restart points are present, multiple restart blocks 310 may be inserted. In one embodiment, all restart edges are directed to a single restart block 310. It will be appreciated that in order to optimize B( ), and limit the number of blocks executed in the speculative region, restart points and commit blocks may be propagated upwards to occur early in the CFG.

The above steps for partial inlining do not necessarily occur in series or in the order suggested by FIG. 5. Once the blocks of IL code and CFG have been modified, and restart and commit blocks inserted, the restart blocks, commit blocks, and selected blocks of the called method B( ) are inlined into the calling method A( ) at 525.

Figure 6:
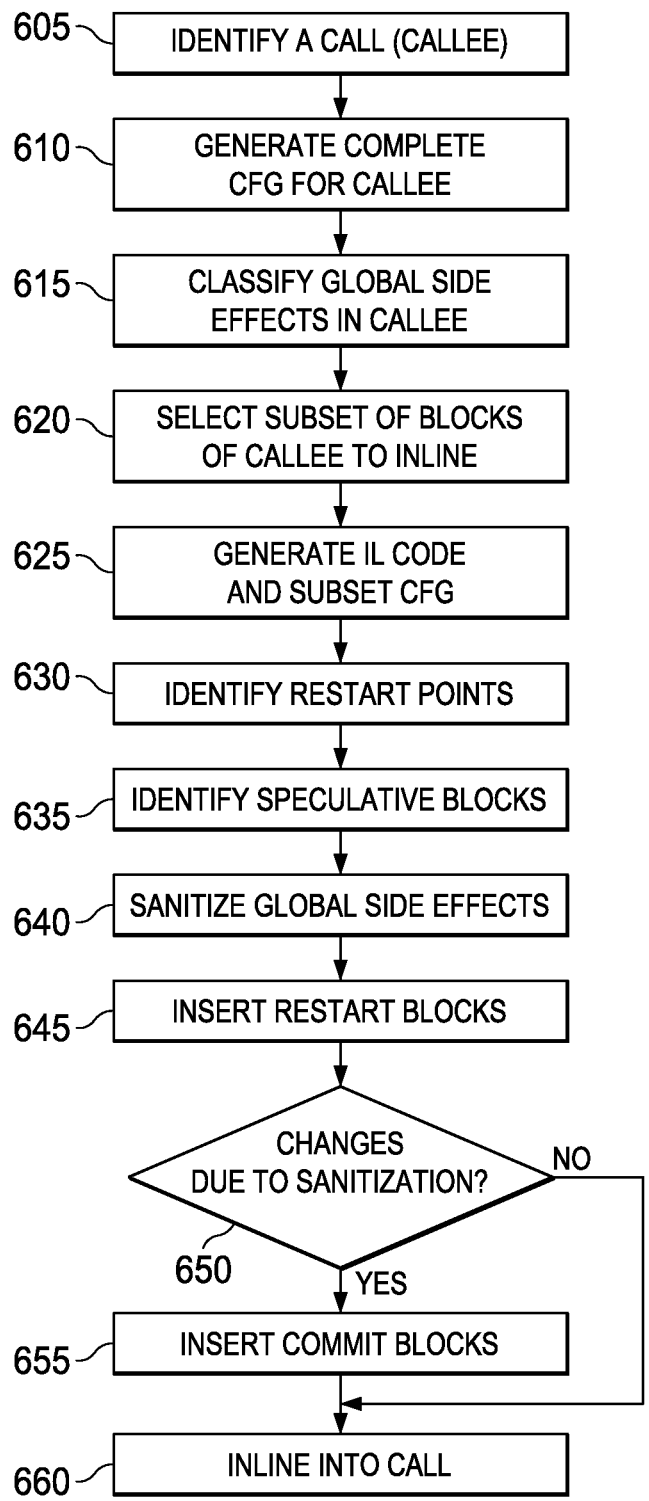
FIG. 6 is a flowchart of a method of selecting blocks and partially inlining selected blocks in accordance with an embodiment of the present disclosure.

FIG. 6 illustrates an example embodiment of selecting blocks and partially inlining code according to the present disclosure which may be performed to partially inline a call into a calling method or to analyze a call to ensure it has no unacceptable global side effects. At 605, a call is identified as a candidate for partial inlining. At 610, a complete CFG, such as the CFG of FIG. 3B, is generated for the callee. At 615, global side effects in the callee are identified and classified as acceptable or unacceptable global side effects. At 620, a subset of blocks of the callee which contains no global side effects, or only acceptable global side effects are selected for inlining. In the embodiment illustrated in FIG. 6, one or more of these actions are performed prior to generating IL code for the callee method.

At 625, IL code is generated for the callee and a subset CFG is created. The subset CFG contains only the selected blocks of the callee. At 630, restart points are identified based on the blocks not selected from the callee. At 635, speculative blocks are identified as any block which may lead to a restart point. At 640, global side effects if present in the selected blocks are sanitized. At 645, restart blocks 310 are inserted. The restart block 310 may contain instructions to restart the callee method. Where the callee method is itself inlined or partially inlined into a second call which also has been partially inlined (into a third call), the restart block 310 contains instructions to restart the second call.

At 650, if no temporary measures or modifications to the speculative blocks have been made to sanitize global side effects, the selected blocks of the callee method, along with the restart blocks, may be inlined into the calling method at 660. If temporary measures or modifications to the speculative blocks have been made which must be put into effect in the global state, a commit block 320 is added at 655. The selected blocks of the callee method, along with the restart blocks 310 and the commit block 320, may be inlined into the calling method at 660.

Side Effects

As described above, global side effects, if present, may be handled by "sanitizing", which includes deferring or undoing, or a combination of deferring and undoing, the results of the global side effects. Sanitizing ensures global side effects properly modify the global state in order to preserve a correct global state of the computer program if a restart of the called method B( ) occurs. In the JAVA environment, example global side effects which may be sanitized and classified as acceptable include stores to global variables, stores to escaping object fields, memory allocations, method calls and caught exceptions. Example global side effects which may not be possible or desirable to sanitize and thus classified as unacceptable include volatiles and monitors. Depending on the global side effect and program environment, sanitizing may rely on measures already present in the program environment as discussed below such that additional measures or modifications to the code are not required. In this case, additional sanitizing measures may nevertheless be applied if, due to the size or type of the global side effect, better optimization is achieved by the additional measures. Example procedures for sanitizing global side effects are described below.

Stores to Globals

Since other methods or threads may access or write to a global, the global state of the program is affected and stores to globals need to be sanitized. An example measure to sanitize a global includes copying the global into a temporary variable or temporary at the start of or within the speculative region. All subsequent accesses to the global use the temporary while in the speculative region. In the commit block after the exit from the speculative region, the value of the temporary is updated to the global. In order to maintain program semantics, the instructions in the commit block may store to the global only if it was stored to in the speculative region. In the case of a conditional store, the temporary measures also track whether the store was executed in the speculative region. A flag may be created and set if the temporary has been stored to. The instructions in the commit block also would check the flag to determine whether to store the temporary to the global. Alternatively, other data structures such as an array list or a hash table may be created to temporarily store copies of globals. For example, a hash table similar to the hash table discussed below may be created if a large and unwieldy number of flags would be used.

Sample source code representing the sanitizing of a global with the use of a temporary and a flag for a conditional store is listed below. In this example, the commit block includes instructions to update the global g1 with temp1 if the flag is true.

Original Code:

```
global g1;
// start of speculative region
if (cond)
  g1 = g1+1;
if (g1 < 10)
  //do something
else
  //do something else
```

Modified Code in Speculative Region:

```
global g1;
//entering new speculative region
temp1 = g1;
flag = false;
if (cond)
{ temp1 = temp1+1 ; flag = true; }
if (temp1 < 10)
  //do something
else
  //do something else
//exit speculative region
//commit block
if (flag)
  g1 = temp1;
```

Stores to Escaping Object Fields

Escaping object fields are references to objects that may be accessible by other methods or threads as well. Since escaping objects may be accessed by other methods, the global state of the program is affected by stores to escaping object fields. Non-escaping objects are not visible to other threads, and as such, do not require sanitization. For escaping objects, stores to a field must be addressed since several objects' references may point to the same underlying object. As the number of escaping objects increase, the amount of time of the processor 15 and storage or memory 20 to keep track of temporary measures to address stores to escaping object fields also will increase. Thus, while stores to escaping object fields may be sanitized, the JIT compiler 70 may determine that specific escaping objects are not desired to be sanitized and the compiler 70 may classify stores to such escaping objects as unacceptable global side effects.

An example measure to sanitize stores to escaping object fields include providing a hash table where the index into the table is a hash based on the object reference and field offset. The value stored in the hash table will be a 3-tuple of {object reference, offset, value}. New values stored to the same field of the same object will overwrite old values.

Near the start of or within the speculative region a small hash table is allocated, such as an instance of the unsynchronized class java/util/HashMap. This hash table will privatize the field stores to objects by keeping track of the values stored to the field. This hash table can have a size known at compile time, which opens up the possibility of scalarizing accesses to it. In this example, each store to a field in the speculative region will be replaced by a call to a JAVA method putfield (object ref, offset, value). This method will place an entry into the hash table. Each load from a field in the speculative region will similarly be replaced by a call to a JAVA method getfield (object reference, offset). This method will return either a temporary value if it is found in the hash table, or the current object value otherwise.

In the commit block after the exit from the speculative region, iterative steps are taken through the hash table to (a) calculate each field address from the stored object reference and the offset and (b) write the associated value in the hash table to the calculated address in order to update the global state. In one embodiment of the present disclosure, the hash table is stack-allocated to reduce access penalties. In another embodiment of the present disclosure, the hash table's array is scalarized for small n (where n is the size of the table).

Alternatively, a temporary replacement such as the measures provided for stores to globals could be used to sanitize stores to escaping object fields. However, depending on the number of escaping object fields to be managed the complexity of such measure likely is undesirable. There are a number of advantages of using a hash table to sanitize stores to escaping object fields in JAVA. Since entries in the hash table are valid object references, JAVA garbage collection can proceed and move objects, and as long as the garbage collector is aware of the hash table, it can correctly update the table with the moved object reference. The putfield( ) and getfield( ) methods described above may be defined in ordinary JAVA code. Not only does this make it more maintainable than a complex compiler analysis; it also means the full power of the optimizer is brought to bear on making it efficient. Finally, the use of a hash table ensures correctness. No extra stores are executed during the commit if no entry was added to the table.

Memory Allocations

Memory allocations comprise JAVA heap allocations which are monitored by the garbage collector 90 of the JAVA virtual machine 50. Due to automatic memory management in the JAVA environment, additional measures may not be needed to sanitize the memory allocations in a speculative region. In the case of a restart of the called method, all references to objects allocated in the speculative region will be collected by the JAVA garbage collector 90 which periodically identifies memory that is no longer in use and frees it for reuse. In other program environments such as C++, measures such as deallocation would be used to explicitly discard memory allocations. Deallocation also may be used in some environments in order to improve performance.

Caught Exceptions

Caught exception edges may be treated as any other type of edge in the CFG. Thus, additional measures to sanitize caught exceptions may not be needed. If a catch block is not selected to be partially inlined and is removed, a restart point is created at the exception edge which is redirected to a restart block. A catch block may be inlined and may require the insertion of a commit block before the execution of the exception block if the speculative region is exited. A catch block itself may contain global side effects and thus must be examined by the JIT compiler to classify the global side effects as acceptable or unacceptable. For some JVM's 50, care will be necessary to ensure the right code is jumped to as simply splitting and inserting new edges in the CFG is not sufficient, exception meta data also must be updated correctly with a change to the location of the exception handler.

Uncaught Exceptions

Uncaught exceptions are problematic during execution of the code partially inlined according the present disclosure if the uncaught exception is thrown in a speculative block. The exception being thrown may be caused by speculative values, that is, results from instructions executed in a speculative block. If a statement in the selected block of code throws an exception and there is no corresponding catch, measure must be taken to sanitize the effects of the uncaught exception. As well, if any temporary measures created in the speculative block are not used to update the global state when the exception is thrown, the global state will not be updated and the cause for the exception to be thrown will have been lost.

An example measure to address uncaught exceptions is to add a generic catch-all block covering all blocks (that can throw an uncaught exception) in the speculative region. The catch-all block includes instructions to catch the exception, commit any speculative operations to update the global state and then proceed to re-throw the exception. The global state is thus corrected for the exception to proceed. Alternatively, the catch-all block may be directed to restart the called method B( ). In one embodiment, a catch-all block is provided for each block in the speculative region.

Volatiles and Monitors

Volatiles and monitors assist with communications between threads. Both of these are fundamentally designed to control access and storage to variables and immediately update the global state. As such, it may not be desirable or possible to sanitize these global side effects without modifying the program semantics. The JIT compiler 70 typically classifies volatiles and monitors as unacceptable global side effects.

Method Calls

Initially, a method call in the blocks selected for partial inlining in itself is an unacceptable global side effect since it is unknown whether global side effects, if any, exist within the called method and whether the global side effects are acceptable or unacceptable. Thus, a block containing a method call cannot, without further analysis, occur in the speculative region. A call may be analyzed and determined to be permissible in the speculative region if it is known that the call is "safe" and does not contain or is highly unlikely to contain global side effects. Examples of safe calls may include but are not limited to purely mathematical functions such as standard trigonometric functions which are known not to contain global side effects. In one embodiment, the JIT compiler 70 is configured to classify safe method calls as acceptable global side effects. Alternatively, a call may be inspected to determine whether it contains global side effects. The analysis or inspection may determine that the method call is an acceptable side effect and the method call may be classified by the JIT compiler 70 accordingly.

Referring to the example CFG of FIG. 3C, if a method call to a third method C( ) occurs in block BB1 or BB2, the block containing the method call initially could not be selected for partial inlining as part of the speculative region. A call to C( ) which occurs in block BB6, a non-speculative block, would be permitted. Further, a call to C( ) within block BB6 also may be fully inlined or analyzed and partially inlined into B( ) according to the methods described herein. In this case, a restart block created as a result of one or more blocks not selected from C( ) would call and restart method C( ) within BB6.

Unknown global side effects can be exposed by inlining the call, partially or fully, or analyzing the called method. If a call to C( ) occurs within block BB1 of FIG. 3C, the entire method C( ) is considered to be included in the speculative region and must meet the constraints described above. C( ) may be fully inlined into B( ) in block BB1 if C( ) does not contain any global side effects or if it contains only acceptable side effects. Alternatively, blocks of C( ) may be selected and partially inlined into BB1 (typically before partial inlining of B( ) into A( )), as long as blocks selected from C( ) for partial inlining do not contain unacceptable global side effects. Blocks of C( ) not selected for partial inlining into BB1 may contain unacceptable global side effects and would be replaced with a restart block. The restart block would cause a restart of the entire method B( ), not the called method C( ). In this case, a restart of C( ) is not sufficient since nested speculative regions are not permitted.

To make a method call acceptable for the speculative region without inlining it, the entire call chain in the block down to the leaf method must be inspected and no global side effects found within the call chain. As described above, a method call to C( ) which occurs in block BB1 or BB2 may be classified as an acceptable global side effect if C( ) is inspected and found to contain no global side effects itself.

This leads to two possible conclusions: one must inline calls on a partial inlining target before analyzing the CFG, or one must perform inlining from the leaf methods towards the root of the call chain, and at each stage determine whether calls may be partially inlined based on knowledge of the previously visited methods (further down the call chain). The second of these two strategies would result in recursive partial inlining.

It will be understood that various optimizations and iterations may be performed to optimize and partially inline method calls. In order to decrease the size of the speculative region and reduce the measures needed to address any global side effects, restart points and commit points may be moved as high as possible. Code motion optimization may be used to move branches leading to a restart point or commit blocks and also to move global side effects out of the speculative region.

Virtual Method Calls

Virtual method calls comprise global side effects similar to method calls as described above. The ability to analyze the method that a virtual method call lands in, and thus determine whether the virtual method call may lead to unacceptable global side effects, will depend on the computer program environment. In a JAVA program environment, if a virtual method call can be devirtualized by the JIT compiler 70, as known for other methods of inlining, the method call may be analyzed for global side effects. If the method call does not contain unacceptable global side effects, it may be classified as an acceptable global side effect and sanitized as described above. Virtual method calls in JAVA which cannot be devirtualized comprise unacceptable global side effects. The virtual guard around the call also may cause a restart if the target is not what was inlined. Alternatively, in a C++ environment, for example, a virtual method call may be analyzed and classified as an acceptable or unacceptable side effect without devirtualization.

Execution

Figure 7:
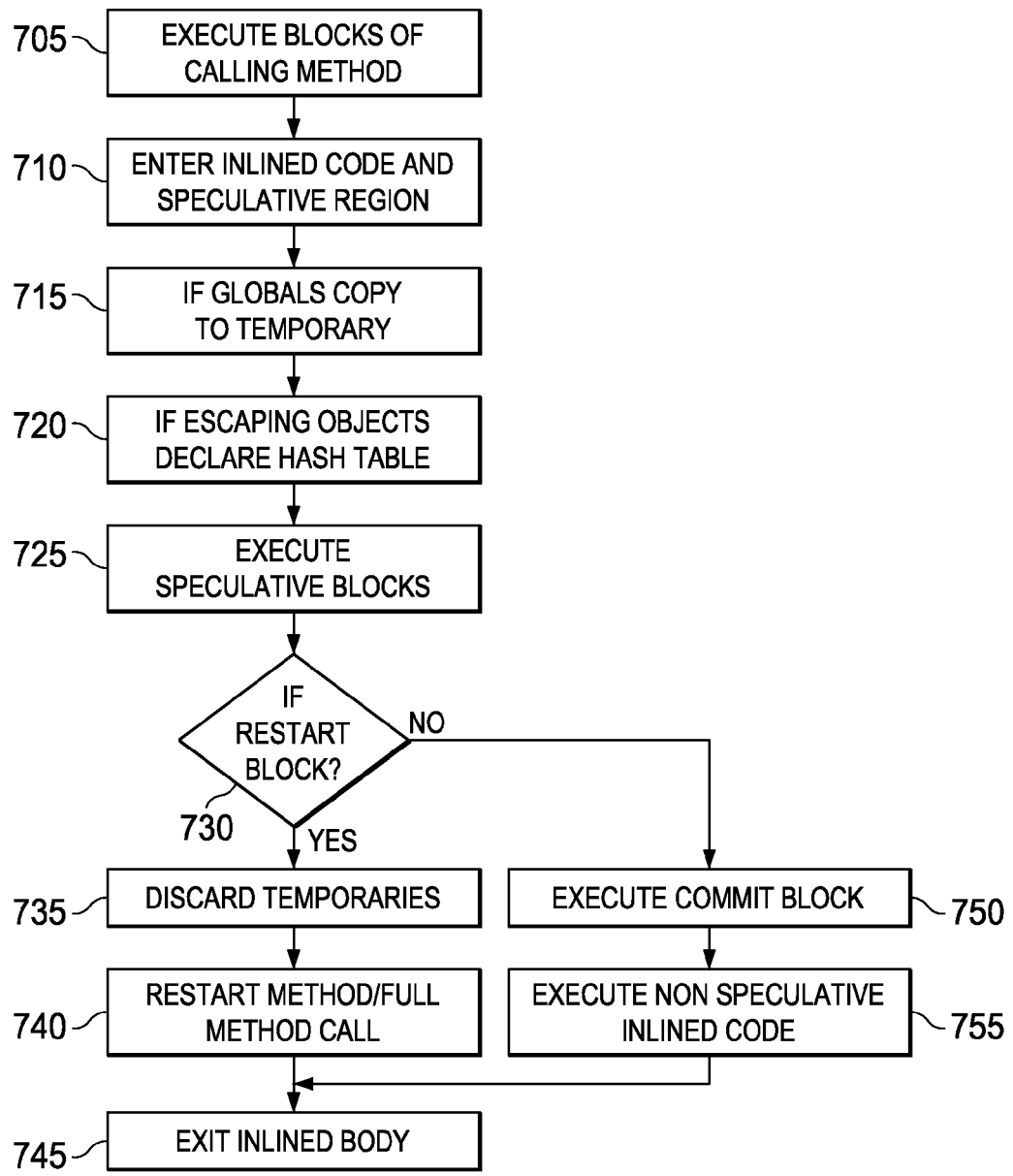
FIG. 7 is a flowchart of execution of a method partially inlined in accordance with an embodiment of the present disclosure.

FIG. 7 illustrates a sample flowchart of the execution of code which has been partially inlined according to the present disclosure. The blocks of the calling method, prior to the call to the called method, are executed at 705. Where the partially inlined method is called, the inlined body and speculative region of the called method are entered at 710. Instructions are executed at 715 and 720 to setup temporary measures to capture the results of global side effects in the speculative region. Example instructions to address stores to globals and stores to escaping object fields as described above are illustrated in FIG. 7. One or more speculative blocks of code are executed at 725.

If a restart block is reached at 730, temporary measures are discarded at 735. The entire called method is restarted at 740. Alternatively, the restart and execution of the complete called method B( ) may be redirected to the interpreter 60. Once the restarted called method has executed, the inlined body is exited at 745. Execution continues with any remaining blocks of code in the calling method (not shown).

If a restart block is not reached as the speculative blocks are executed, a commit block is executed after the exit from the speculative region at 750. Any blocks of non-speculative inlined code for the called method are executed at 755 and the inlined body is exited at 745. Execution continues with any remaining blocks of code in the calling method (not shown).

The flowcharts and block diagrams in the Figures illustrate the architecture, functionality, and operation of possible implementations of systems, methods and computer program products according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of partial inlining called blocks of code into calling blocks of code of a computer program, comprising data processing system implemented steps of:
   selecting a subset of blocks of the called blocks of code for inlining into the calling blocks of code;
   creating a restart block to restart the called blocks of code in place of non-selected blocks of the called blocks of code, wherein the restart block contains instructions to exit from the selected blocks of code and call a previously compiled version of the called blocks of code;
   sanitizing global side effects in the selected subset of blocks in order to preserve a correct global state of the computer program if a restart of the called blocks of code occurs; and
   inlining the restart block and the selected blocks into the calling blocks of code of the computer program.

2. The method according to claim 1, wherein sanitizing global side effects in the selected blocks in order to preserve a correct global state of the computer program if a restart of the called blocks of code occurs comprises:
   modifying the selected blocks to create temporary measures to capture results of global side effects; and
   inserting one or more commit blocks containing instructions to update the global state of the computer program based on the temporary measures;
   and wherein inlining the restart block and the selected blocks into the calling blocks of code of the computer program further comprises inlining the commit block, the selected blocks and any modified selected blocks.

3. The method according to claim 2, wherein the restart block contains instructions to exit from the selected blocks of code, discard temporary measures in the selected blocks and call a previously compiled version of the called blocks of code.

4. The method according to claim 2, wherein creating the restart block to restart the called blocks of code in place of non-selected blocks of the called blocks of code includes redirecting restart points at edges of the selected blocks leading to the non-selected blocks to the restart block.

5. The method according to claim 4, wherein,
   selected blocks in one or more paths leading to restart points comprise a speculative region,
   exits from the one or more paths in the speculative region to selected called blocks of code or to calling blocks of code comprise commit points, and
   inserting the commit block with instructions to update the global state of the computer program based on the temporary measures further comprises inserting one commit block at each commit point.

6. The method according to claim 5, wherein the commit block at the exit of the path contains a sequence of instructions to update the global state of the computer program based on temporary measures in the selected blocks in that path to the commit point.

7. The method according to claim 2 further comprising:
   identifying global side effects in the called blocks of code;
   classifying identified global side effects as acceptable or unacceptable; and
   wherein selecting the subset of blocks of the called blocks of code for inlining into the calling blocks of code comprises selecting blocks containing only acceptable global side effects or no global side effects.

8. The method according to claim 7, wherein identifying global side effects in the called blocks of code and classifying identified global side effects as acceptable or unacceptable occur after selecting the subset of blocks of the called blocks of code for inlining into the calling blocks of code, the method further comprising unselecting selected blocks containing unacceptable side effects and repeating selecting the subset of blocks of the called blocks of code for inlining into the calling blocks of code, the selected blocks containing only acceptable global side effects or no global side effects.

9. The method according to claim 7, wherein an acceptable global side effect comprises one or more instructions whose effects on the global state of the computer program may be sanitized.

10. The method according to claim 7, wherein in a JAVA computer program environment, an acceptable side effect comprises one or more instructions resulting in stores to globals, stores to escaping object fields, memory allocations, method calls, caught exceptions or uncaught exceptions.

11. The method according to claim 7, wherein for an acceptable side effect comprising a store to a global, modifying the selected blocks to create temporary measures to capture results of global side effects comprises:
adding instructions to create a temporary variable and a flag,
modifying instructions in the selected block to use the temporary variable in place of the global, and
adding instructions to set the flag if a store to the temporary variable occurs; and
wherein the commit block comprises instructions to store the temporary variable to the global on a condition of the flag being set.

12. The method according to claim 7, wherein for an acceptable side effect comprising a store to an escaping object field, modifying the selected blocks to create temporary measures to capture results of global side effects comprises:
allocating a hash table to store values indexed based on an object reference and a field offset associated with each value; and
replacing references to escaping object fields with instructions referencing the hash table; and
wherein the commit block comprises instructions to write values in the hash table to an address based on the object reference and field address associated with each value.

13. The method according to claim 1, wherein sanitizing global side effects in the selected blocks in order to preserve a correct global state of the computer program if a restart of the called blocks of code occurs comprises using one or more operations of an architecture of the computer program to undo, defer, or undo and defer changes to the global state of the computer program.

14. The method according to claim 1, wherein the selected subset of blocks of the called blocks of code for inlining into the calling blocks of code comprise at least one path through the called blocks of code.

15. The method according to claim 1, wherein the called blocks of code comprise a called method and wherein the calling blocks of code comprise a calling method.

16. The method according to claim 1, wherein the computer program comprises a JAVA language computer program.

17. A data processing system for optimizing a computer program which includes calling blocks of code and called blocks of code, the data processing system comprising an optimizer configured to:
select a subset of blocks of the called blocks of code for inlining into the calling blocks of code;
create a restart block to restart the called blocks of code in place of non-selected blocks of the called blocks of code, wherein the restart block contains instructions to exit from the selected blocks of code and call a previously compiled version of the called blocks of code; and
sanitize global side effects in the selected subset of blocks in order to preserve a correct global state of the computer program if a restart of the called blocks of code occurs; and
inline the restart block and the selected blocks into the calling blocks of code of the computer program.

18. The data processing system according to claim 17 further comprising a code generator configured to generate machine-readable code for the calling blocks of code and the inlined blocks of code.

19. The data processing system according to claim 18 further comprising a just-in-time (JIT) compiler including the optimizer and the code generator.

20. The data processing system according to claim 19 further comprising a JAVA virtual machine (JVM) configured to execute the machine-readable code, the JVM including the JIT compiler and an interpreter, and wherein the restart of the called blocks of code is performed by the interpreter.

21. The data processing system according to claim 17, wherein the optimizer configured to sanitize global side effects in the selected blocks in order to preserve the correct global state of the computer program if a restart of the called blocks of code occurs is further configured to:
modify the selected blocks to create temporary measures to capture results of global side effects;
insert one or more commit blocks containing instructions to update the global state of the computer program based on the temporary measures; and
inline the restart block, the selected blocks, the commit block and any modified selected blocks into the calling blocks of code of the computer program.

22. The data processing system according to claim 17, wherein the optimizer is configured to identify global side effects in the called blocks of code; classify identified global side effects as acceptable or unacceptable; and wherein the optimizer is further configured to select the subset of blocks of the called blocks of code for inlining into the calling blocks of code containing only acceptable global side effects or no global side effects.

* * * * *